United States Patent [19]
Swanson

[11] Patent Number: 5,861,134
[45] Date of Patent: Jan. 19, 1999

[54] LOW DENSITY SILICA PARTICLES AND METHOD FOR THEIR PREPARATION

[75] Inventor: Donald Keith Swanson, Wilmington, Del.

[73] Assignee: E. I. du Pont de Nemours and Company, Wilmington, Del.

[21] Appl. No.: 871,162

[22] Filed: Jun. 9, 1997

[51] Int. Cl.[6] .................... C01B 33/113; C03C 11/00
[52] U.S. Cl. .................... 423/335; 501/39; 502/10; 23/308 R
[58] Field of Search ................ 423/335; 501/39, 501/65; 502/10; 23/308 R

[56] References Cited

U.S. PATENT DOCUMENTS

| | | | |
|---|---|---|---|
| 2,472,490 | 6/1949 | Plank | 501/39 |
| 3,511,605 | 5/1970 | Smith et al. | 423/335 |
| 3,592,619 | 7/1971 | Elmer et al. | 501/39 |
| 3,935,299 | 1/1976 | Kiselev et al. | 423/335 |
| 4,029,513 | 6/1977 | Vessey et al. | 423/335 |
| 4,837,195 | 6/1989 | Cox et al. | 502/10 |
| 4,983,550 | 1/1991 | Goetz et al. | 501/39 |
| 5,256,600 | 10/1993 | Pfitzen maier | 501/4 |

FOREIGN PATENT DOCUMENTS

| | | | |
|---|---|---|---|
| 373255 | 2/1975 | U.S.S.R. | 423/335 |
| 2127009 | 4/1984 | United Kingdom | 423/335 |

OTHER PUBLICATIONS

T.J. Rockett and W. R. Foster, *Journal of American Ceramic Society*, 48 [2], pp. 75 to 80, 1965, (No Month).

*Primary Examiner*—Ngoc-Yen Nguyen

[57] ABSTRACT

Internal porosity is created in dense $SiO_2$ particles by heating a mixture of the particles with $B_2O_3$ above the melting point of both mixture components. Resulting $SiO_2$ particles have altered morphology, internal porosity, and a negative thermal expansion coefficient when heated.

9 Claims, 7 Drawing Sheets

LOW DENSITY SILICA PARTICLES AND METHOD FOR THEIR PREPARATION

BACKGROUND OF THE INVENTION

1. Technical Field

This invention relates to low density silica particles conveniently prepared by heating a mixture of boric acid or $B_2O_3$ with silica particles above the melt temperature (i.e., liquidus line) of the mixture. Silica particles so prepared individually have internal porosity and exhibit unique properties, such as a negative thermal expansion coefficient when first heated after preparation. The particles are useful for a variety of applications, such as a catalyst support or in resin blends used in electronic packaging.

2. Background Information

Silica particles are well known in the art and have found a broad range of applications due to the chemical inertness of silica and its favorable dielectric properties. Common applications include use as a catalyst support, as media in liquid chromatography, and as filler in resins employed in electronic packaging.

Silica generally is prepared using a mechanical, fumed, or chemical process. Conventional mechanical and fumed processes produce solid particles having little or no internal porosity. Variations in bulk densities are attributed to particle size and how tightly the particles are packed. Conventional chemical processes for producing xerogels and aerogels do create particles having internal porosity, but these processes are expensive and there is limited commercial capacity. The lower cost mechanical processes tend to produce particles having an angular morphology that are undesirable for applications such as resin/filler systems used in electronic packaging.

Thus, there continues to be a need for economical methods of producing silica particles having internal porosity. Also, there continues to be a need for silica particles having unique properties.

SUMMARY OF THE INVENTION

It now has been found that internal porosity can be introduced to silica particles, and any surface angularity can be reduced, by heating the silica particles in the presence of $B_2O_3$ to a temperature above the liquidus curve for that mixture. Accordingly, the present invention provides a process for preparing silicon dioxide particles comprising, in sequence:

a. forming an intimate mixture of silicon dioxide particles and at least one boron compound selected from the group consisting of $B_2O_3$ and boric acid;

b. heating said intimate mixture to a temperature above the liquidus curve of said mixture for a time sufficient to alter the density and/or morphology of said individual silicon dioxide particles;

c. cooling the mixture to ambient conditions; and d. recovering discrete silicon dioxide particles.

It also has been discovered that the recovered silicon dioxide particles have the unusual property of shrinking when subsequently heated to a temperature in the range of approximately 100° to 400° C. This property makes the particles particularly useful as a filler to adjust the thermal expansion coefficient of resins applied during the fabrication of articles, such as electronic packaging, to minimize thermal induced stresses during the manufacture process. Accordingly, this invention also provides discrete porous $SiO_2$ particles that have an Initial Negative Expansion Coefficient, as the term is defined herein.

DESCRIPTION OF THE PREFERRED EMBODIMENTS

The silica particles of the invention conveniently are prepared by forming a mixture of $B_2O_3$ or boric acid ($H_3BO_3$) with amorphous or crystalline silica particles and heating the mixture to a temperature above the liquidus curve as described in detail hereinbelow. The mixture then is cooled and the $B_2O_3$ is removed. Silica particles thereby formed have internal porosity.

Silica/Boron Mixture

The selected silica may be amorphous or crystalline, such as fused silica or quartz. The effect of the invention is achieved with any size of silica particles, but the selected particles typically have any average particle size in the range of 5 to 500 microns. Typical starting materials include beach sand, quartz, or commercial fused silicas.

The silica particles are blended with $B_2O_3$, boric acid, or other precursors that forms $B_2O_3$ in situ, in dry form or preferably with the addition of water to facilitate formation of an intimate mixture. As used herein, the compound "$B_2O_3$" includes a precursor compound that breaks down in situ to form $B_2O_3$. Conventional mixing equipment is employed for this purpose.

The effect of $B_2O_3$ on the silica particles may be observed at low levels, such as with mixtures containing 5% $B_2O_3$ by weight. Typically the mixture will contain 20% to 80% $B_2O_3$, preferably 30% to 60% $B_2O_3$, wherein the percentages are weight percentages of the total $SiO_2$ and $B_2O_3$ mixture. If boric acid or another precursor of $B_2O_3$ is selected, the quantity added is adjusted such that the actual quantity of $B_2O_3$ is within the desired range.

Selection of the optimum amount of $B_2O_3$ varies with the $SiO_2$ particles selected for the process, heating "soak time" as discussed hereinafter, and the extent to which it is desired to introduce internal porosity to the particles. Another factor taken into account is the cost of processing and recovering $B_2O_3$ in the process.

Heating Step

The blend of $SiO_2$, $B_2O_3$ and/or boric acid, and water (if introduced as a mixing aid) is heated to an elevated temperature. Any boric acid present decomposes to form $B_2O_3$ and water, which rapidly evolves and is removed from the mixture along with any water present as a mixing aid.

Figure 1:
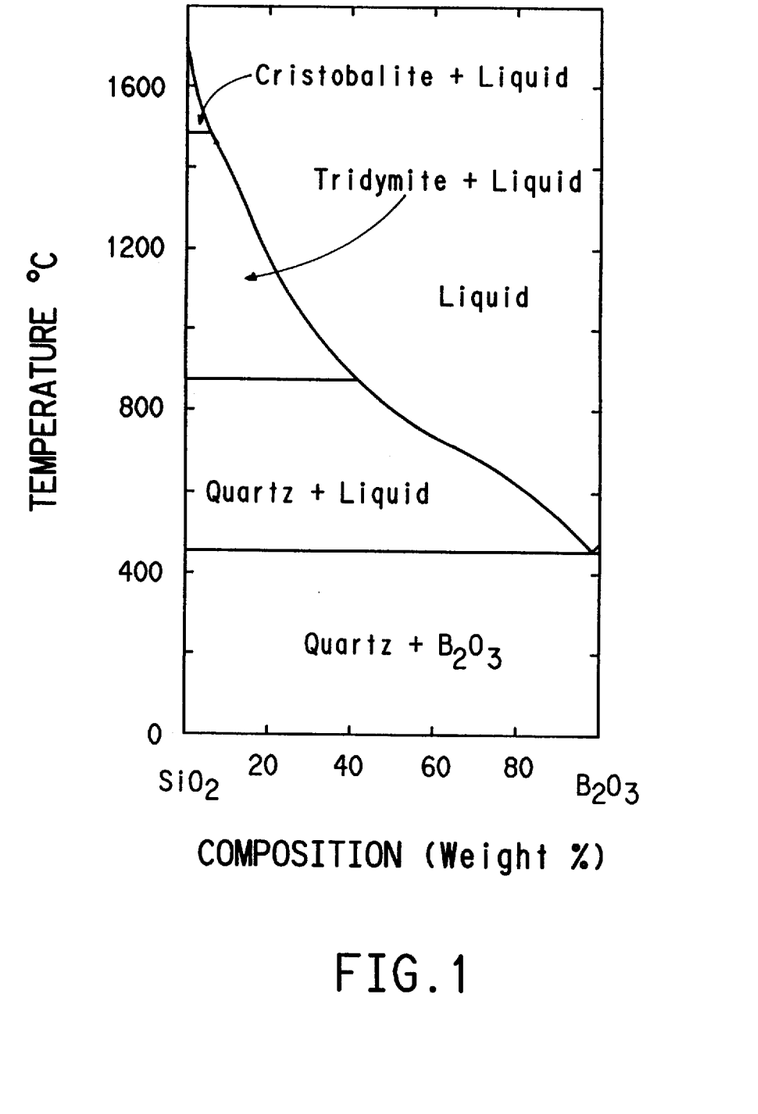
FIG. 1 is a phase diagram for crystalline silica and $B_2O_3$.

Heating is continued to a temperature above the liquidus curve for the particular mixture that has been selected. As illustrated in FIG. 1, $B_2O_3$ melts at approximately 450° C. at all concentrations. The temperature at which crystalline $SiO_2$ (e.g., quartz and related tridymite and cristobalite) also melts, however, varies with the relative proportions of $SiO_2$ and $B_2O_3$ contained in the mixture, as reported by T. J. Rockett and W. R. Foster in *Journal of American Ceramic Society*, 48 [2], pages 75 to 80 (1965). The phase diagram for amorphous $SiO_2$ and $B_2O_3$ is similar, with the amorphous silica melting at a temperature between about 450° C. and 1600° C. that varies with the relative proportions of $SiO_2$ and $B_2O_3$ contained in the mixture. The term "liquidus curve" refers to the plot of composition-dependent temperatures at which the $SiO_2$ and $B_2O_3$ are both in the liquid phase. It is important to note that, for the purposes of the invention, $B_2O_3$ and $SiO_2$ behave as immiscible liquids above the liquidus curve at soak times and temperatures typically selected in practicing the invention.

In accordance with the invention, the mixture is heated to a temperature above the liquidus curve for that particular mixture. It will be appreciated that the $SiO_2$ does not instantaneously melt at temperatures above the liquidus curve, but there is a "soak time" during which the elevated temperature takes effect. First the outer layer of the $SiO_2$ particles become tacky, then the particles are slowly digested, as molten $B_2O_3$ erodes and diffuses into the particles.

The desired soak time will vary with how high the selected temperature is above the liquidus curve for that mixture composition, size and morphology of the $SiO_2$ particles, and the extent to which it is desired to introduce internal porosity in the $SiO_2$ particles. It is not desirable to totally melt the $SiO_2$ particles. Not much effect is observed at soak times as short as 30 minutes when a temperature is selected only slightly above the liquidus curve. The selected soak time typically will be 1 to 20 hours, preferably 1 to 4 hours.

Cooling Step

When the mixture has been held above its liquidus curve temperature for the selected soak time, it then is cooled to ambient temperature. In a preferred embodiment the mixture is cooled in two stages.

In the first stage, the mixture is cooled to a temperature above the melting temperature of $B_2O_3$, but below the liquidus curve temperature for that composition, and held within that temperature range for sufficient time to permit the $SiO_2$ to solidify as durable particles capable of withstanding physical processing. Typically hold times of 30 minutes to 2 hours are suitable for this purpose. This embodiment offers the potential advantage of permitting easier removal of the mixture from the heating vessel rather than waiting until the mixture has reached ambient temperature. In this embodiment, a portion of the $B_2O_3$ (which is still in the liquid state) can be removed from the $SiO_2$ particles mechanically, such as by filtration. The portion containing the solid $SiO_2$ particles then is cooled to ambient temperature.

Particle Recovery

Residual $B_2O_3$ contained in and on the $SiO_2$ particles is readily removed by washing with water. The compound $B_2O_3$ generally is not considered environmentally hazardous, and boron compounds may be additives in commercial compositions employing the $SiO_2$ particles. Thus, it may not be necessary to take elaborate care to remove trace quantities of $B_2O_3$ contained in internal pores of the $SiO_2$ particles for many applications.

Particle Properties

Resulting $SiO_2$ particles have a substantially higher surface area and substantially lower bulk density than the particles introduced to the process due to internal porosity formed in the particles. Bulk density of dry powder consisting of these particles typically is in the range of 0.2 to 0.6 g/cc, preferably 0.3 to 0.5 g/cc, compared to the bulk density of 1.0 g/cc for a typical commercial fused silica powder.

Individual particles typically have a "shredded wheat" appearance when viewed with a microscope. If the $SiO_2$ particles fed to the process had angular morphology, the resulting particles will have a more regular morphology (i.e., less angularity).

Surprisingly, it also has been found that pellets pressed from the particles possess the unexpected property of having an Initial Negative Thermal Expansion Coefficient when heated. The term "Initial Negative Thermal Expansion Coefficient" as used herein is defined as meaning that pellets consisting of the SiO2 particles actually shrink the first time the pellets are heated to a temperature in the range of approximately 100° to 400° C., using the test method described in Example 1. This phenomenon may be observed over only a portion of the 100° to 400° C. range in order to satisfy the definition.

Figure 2:
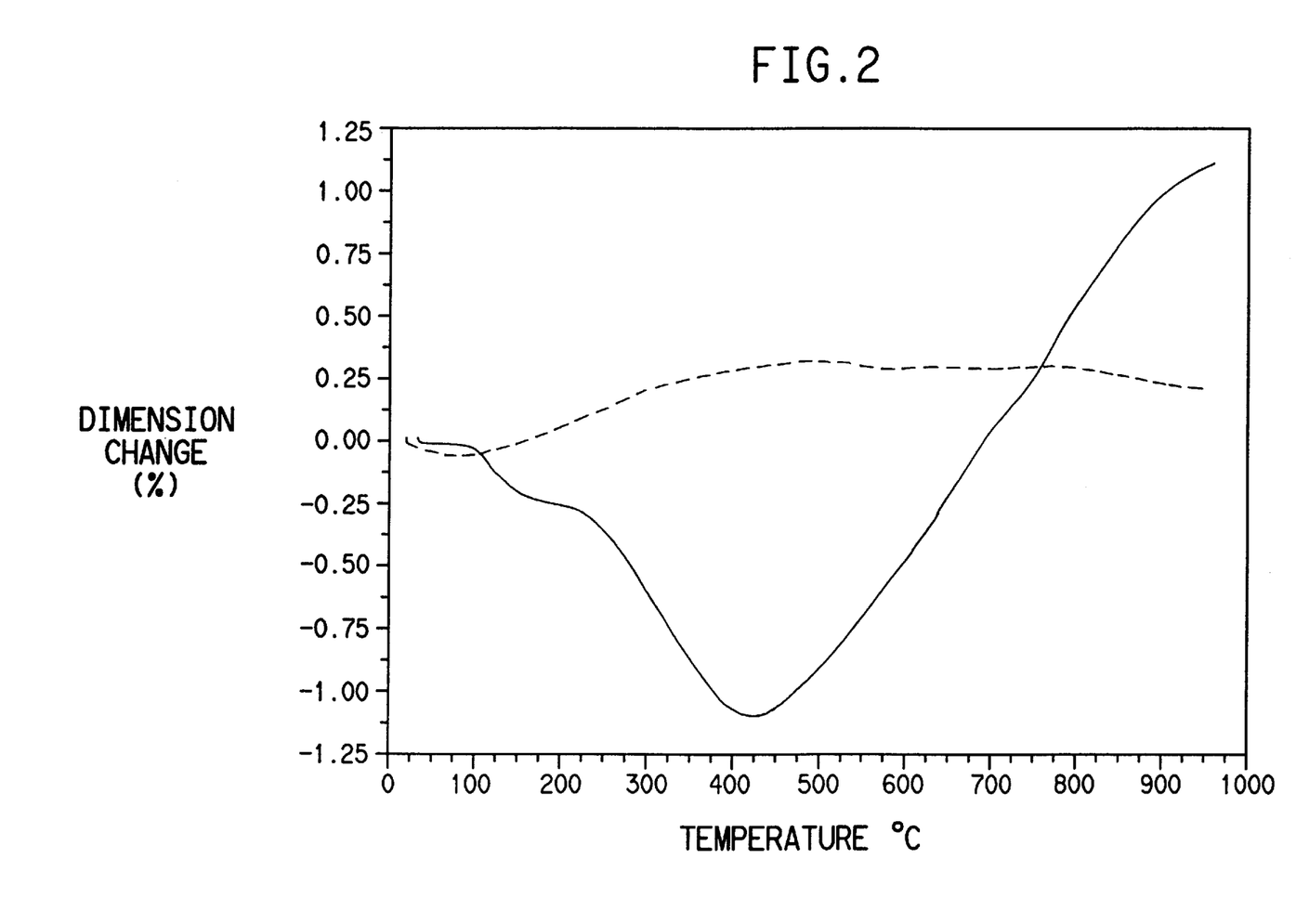
FIG. 2 illustrates dimensional changes observed in pellets made from a lot of particles prepared in accordance with the invention upon a subsequent heating.
Figure 3:
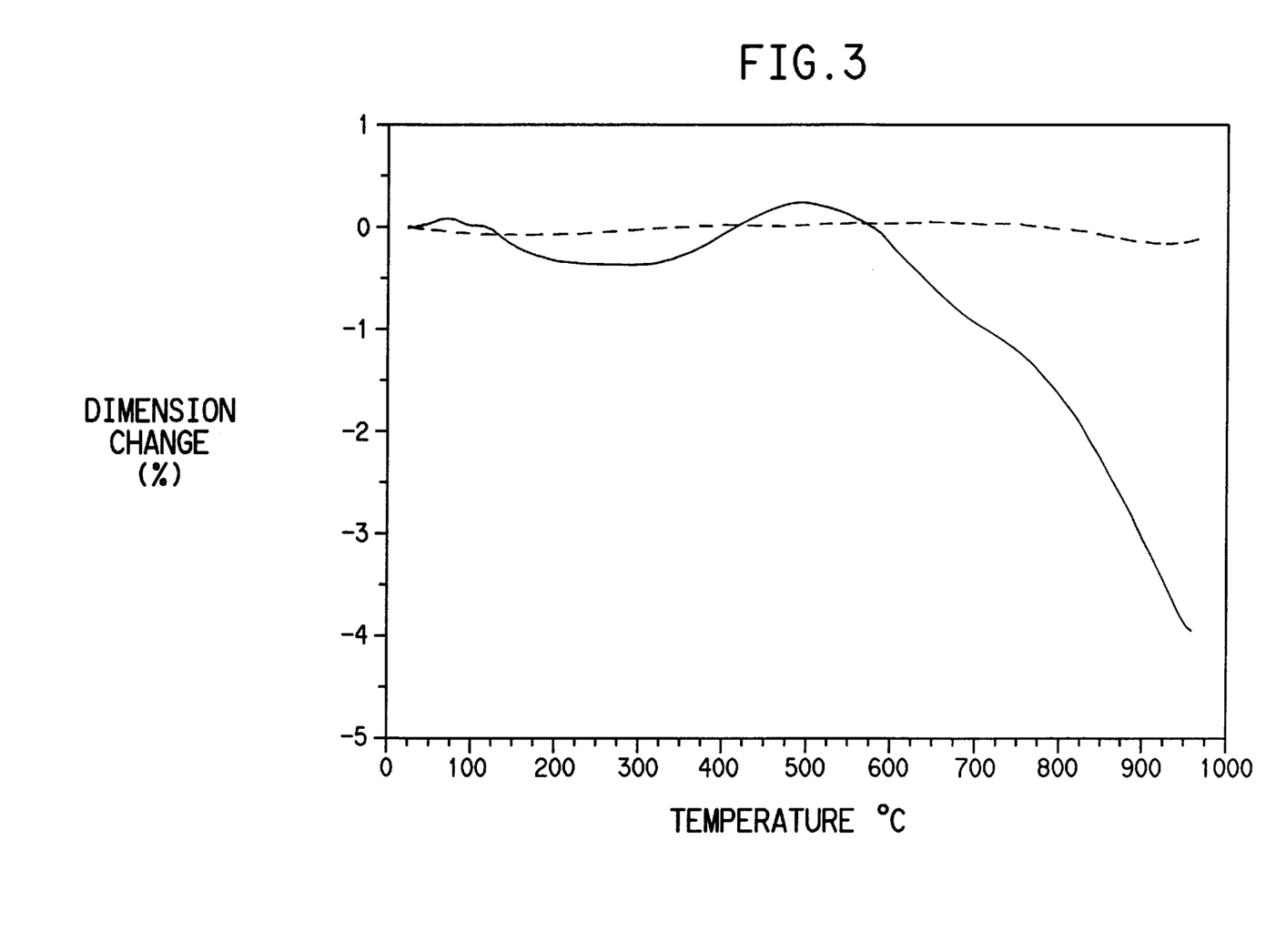
FIG. 3 illustrates dimensional changes observed in pellets made from a second lot of particles prepared in accordance with the invention upon a subsequent heating.

Without being bound by theory, it appears that internal particle voids contract (irreversibly) within at least a portion of the 100° to 400° C. temperature range, at a rate higher than thermal expansion of the SiO2, causing a net reduction in pellet (and particle) size. FIGS. 2 and 3 reflect this phenomena for pellets prepared from two representative lots of particles in accordance with the invention and are discussed further in the Examples.

INDUSTRIAL APPLICABILITY

The particles may be used in conventional applications for silica particles. Moreover, the properties discussed above make the particles particularly suited for specialty applications requiring an inexpensive $SiO_2$ having low density, a porous structure, or more regular particle morphology. For example, the relatively large surface area to volume ratios of these particles makes them potential candidates for catalyst supports and chromatography media. Also, the internal pores can be impregnated with a liquid and the particles employed as a delivery or containment vehicle.

The high degree of internal porosity, which can trap air, also makes the particles useful as a filler in specialty polymer insulation formulations. Entrapped air also lowers the dielectric constant of the particles, making them useful as a filler for polymers used in electronic applications.

The particles are also particularly suited for use as a filler in polymers employed in electronic packaging. The Initial Negative Thermal Expansion Coefficient can be used to help offset the typically high thermal expansion coefficients of organic resins used in electronic packaging. Thus, the resin may be designed to have an overall thermal expansion coefficient similar to that of the intended substrate or component to be encapsulated. In this way stresses (e.g., "thermal mismatch") created during the fabrication can be minimized. Also, due to the regular morphology of the particles, the particles are less likely than conventional mechanical silicas to become lodged between connector wires as the polymer composite is cast into place.

Having described the invention, it now will be illustrated, but not limited, by the following examples.

EXAMPLES

Example 1

12 grams of silica powder, $SiO_2$ (Minsil 40, commercially available from Minco Inc.), was dry mixed with 21.2 grams of boric acid, $H_3BO_3$ (GR powder from EM Science Industries Inc.) in an alumina crucible. A small amount of deionized (DI) water was then added and stirred in to make a mix with a paste-like consistency. This procedure was repeated again in a second alumina crucible. The two crucibles were then covered, placed in a small box furnace, and heated to 1000° C. and held at that temperature for four hours. The temperature was then lowered to 500° C. and held there for thirty minutes followed by turning off the power to the furnace and allowing the two crucibles to cool to room temperature. The crucibles were then immersed in about 3.5 liters of DI water in a 4 liter glass beaker and manually scraped so as to remove the friable-like powder pellet which had formed in each crucible. The powder/water mixture was then heated to about 90° C. while being agitated for one hour to solubilize the $B_2O_3$ and isolate it from the $SiO_2$ powder. The mixture was allowed to cool to room temperature and then was reslurried and allowed to set for 30 minutes. A major fraction of the powder, designated as A, was observed to have settled out of suspension while a minor fraction, designated as B, was observed to still be suspended in the water. This B fraction was decanted off to another 4 liter beaker and allowed to settle overnight. The A powder was transferred to a Buchner funnel with filter paper and was washed with 8 liters of DI water. After the B fraction had settled out of solution the water was decanted off and the powder was reslurried with another 4 liters of DI water and isolated by transferring to a filter. Both powders were dried in a vacuum oven at 130° C. for 12 hours.

The weight of the A powder was 16.7 grams and the B powder was 6.3 grams. The total yield of 23 grams agrees well with the starting weight of 24 grams of $SiO_2$ powder that was used. Three grams of the Minsil 40 and A and B powders were each charged to a 10 cc graduated cylinder and manually tapped 30 times to give approximate tap densities of 1.14, 0.50, and 0.32 g/cc, respectively. X-ray diffraction data, surface areas, particle size distribution parameters d16/d50/d84/dmax as measured by laser light scattering, and mercury and nitrogen porosimetry data were collected to characterize the three powders. The results are provided in Table 1.

TABLE 1

|  | Minsil 40 | A powder | B powder |
|---|---|---|---|
| X-ray diffraction | amorphous | amorphous | amorphous |
| $d_{16}$ | 6 microns | 7 | 6 |
| $d_{50}$ | 25 | 15 | 11 |
| $d_{84}$ | 57 | 31 | 23 |
| $d_{max}$ | 148 | 105 | 105 |
| BET surface area | 1 m²/g | 221 | 382 |
| bulk density (Hg)* | 1.00 g/cc | 0.38 | 0.35 |
| intrusion volume (Hg)* | 0.46 cc/g | 1.76 | 1.95 |
| surface area of pores between 17–3000 angstroms in diameter ($N_2$)* | 1.3 m²/g | 70.3 | 165.5 |
| pore volume of pores between 17–3000 angstroms in diameter ($N_2$)* | 0.0056 cc/g | 0.0717 | 0.1644 |

*(Hg) and ($N_2$) represent data obtained from mercury and nitrogen porosimetry, respectively.

Figure 4:
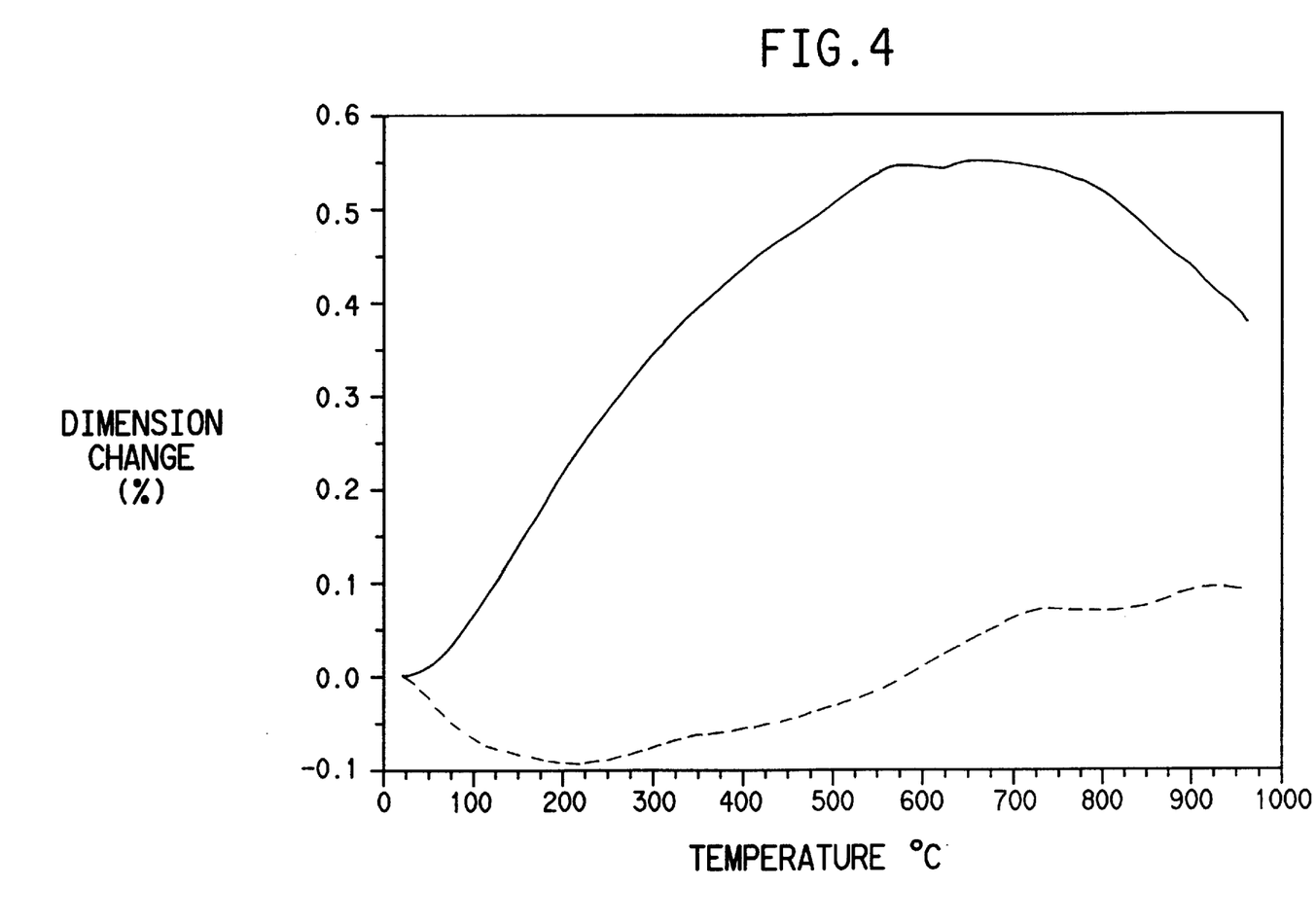
FIGS. 4 through 7 illustrate dimensional changes observed in pellets made from commercial lots of particles upon heating.

In addition to the above data the powders were characterized in terms of their thermal expansion behavior using a thermal mechanical analysis, or TMA. The data were collected using a Thermomechanical Analyzer, model #2940, made by TA Instruments. The powders were pressed into cylindrical pellets with approximate dimensions of 7 mm in diameter and 3 mm in height at a force of 2,000 pounds. The pellets were then heated at about 10° C./ min up to 950° C. and the relative change in the height dimension was measured. These data are plotted in FIGS. 2, 3, and 4, where the x-axis is temperature and the y-axis is % dimension change. FIG. 4 is the TMA data for the Minsil 40 powder. It shows a fairly typical behavior for a powder comprised of dense silica particles, expanding from about 100° C. to 600° C. and reaching a maximum expansion of about ±0.5% at 600° C. The pellet made from the A fraction powder exhibits a marked contrast in its TMA data shown in FIG. 2. In this case, the pellet is observed to contract from about 100° C. to 400° C., yielding a contraction, or negative thermal expansion, of about –1.1% at 400° C. Upon further heating the pellet undergoes a linear expansion up to 950° C. The pellet made from the B fraction of powder also exhibits a different trend in its TMA data as shown in FIG. 3. In this case, the pellet is observed to exhibit a contraction from about 100° C. to about 200° C. of about –0.4%. It then remains flat until about 300° C. at which time it exhibits an expansion up to about 500° C. that peaks at about ±0.25% at 500° C. A further increase in temperature results in a contraction of the pellet equal to –4.0% at 950° C.

These pellets were cooled to room temperature and then run again using the same temperature profile. The TMA curves for the second passes are illustrated with a dashed line. The character of these curves is quite different from that of the original TMA data. In particular, FIG. 2 shows a slight expansion up to about 0.3% upon reheating from 100° C. to 500° C. This is very different from the initial heating of that pellet which exhibits a contraction of about –1.1% at 400° C. This implies that the observed negative thermal expansion is a one time phenomenon over the temperature range of about 100° C. to 400° C., and is not reversible.

Comparative Example 2

The Initial Negative Thermal Expansion Coefficient exhibited by the pellet made from the A fraction powder of Example 1 is unexpected and clearly different from that of a pellet comprised of dense silica particles as shown in FIG. 4. Such behavior could be indicative of high surface area powders and/or powders comprised of particles possessing a high degree of internal porosity. To determine if this is true three commercially available powders were measured using TMA and the procedure as defined in Example 1. The silica powders used were:

a) Cab-o-sil(R), fumed amorphous silica, Grade PTG, made by CABOT Corporation. and two different silica powders obtained from Alpha Aesar, a Johnson Mathey Company located in Ward Hill, Mass., defined as b) an 8 mesh material, catalog #89346, with 1 cc/g of porosity, and c) a 58 micron powder, catalog #89385, with 1 cc/g of porosity.

Figure 5:
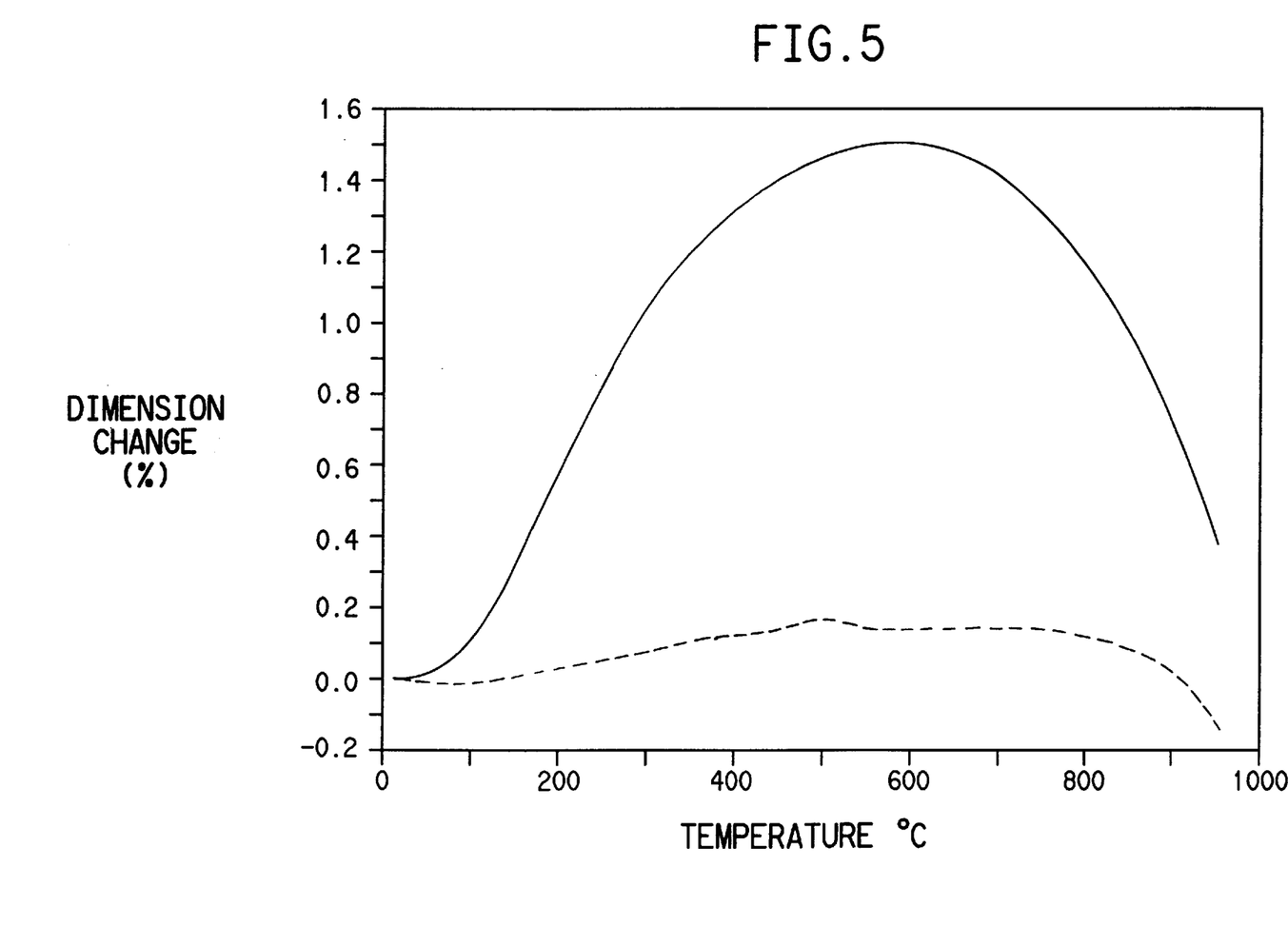
Figure 6:
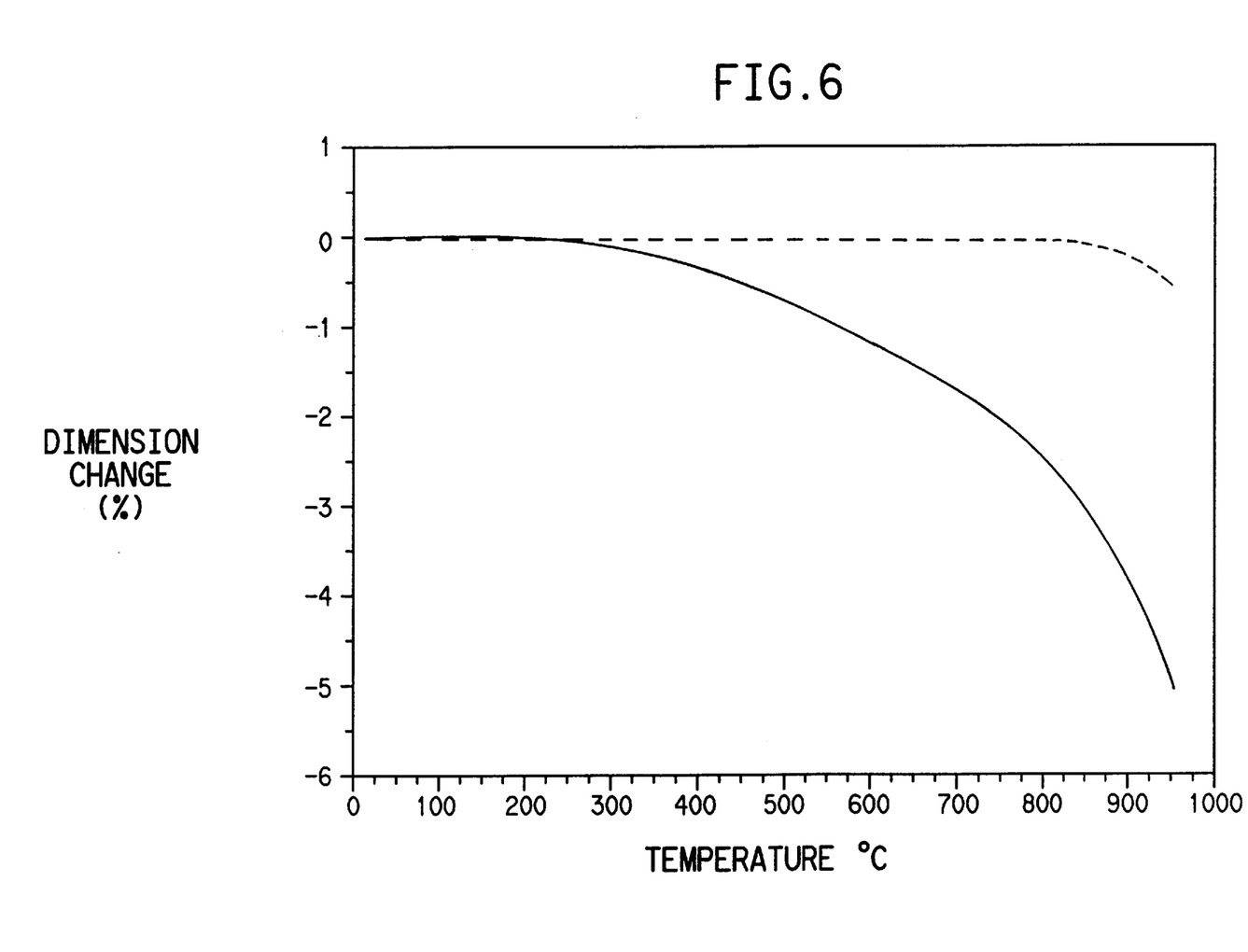
Figure 7:
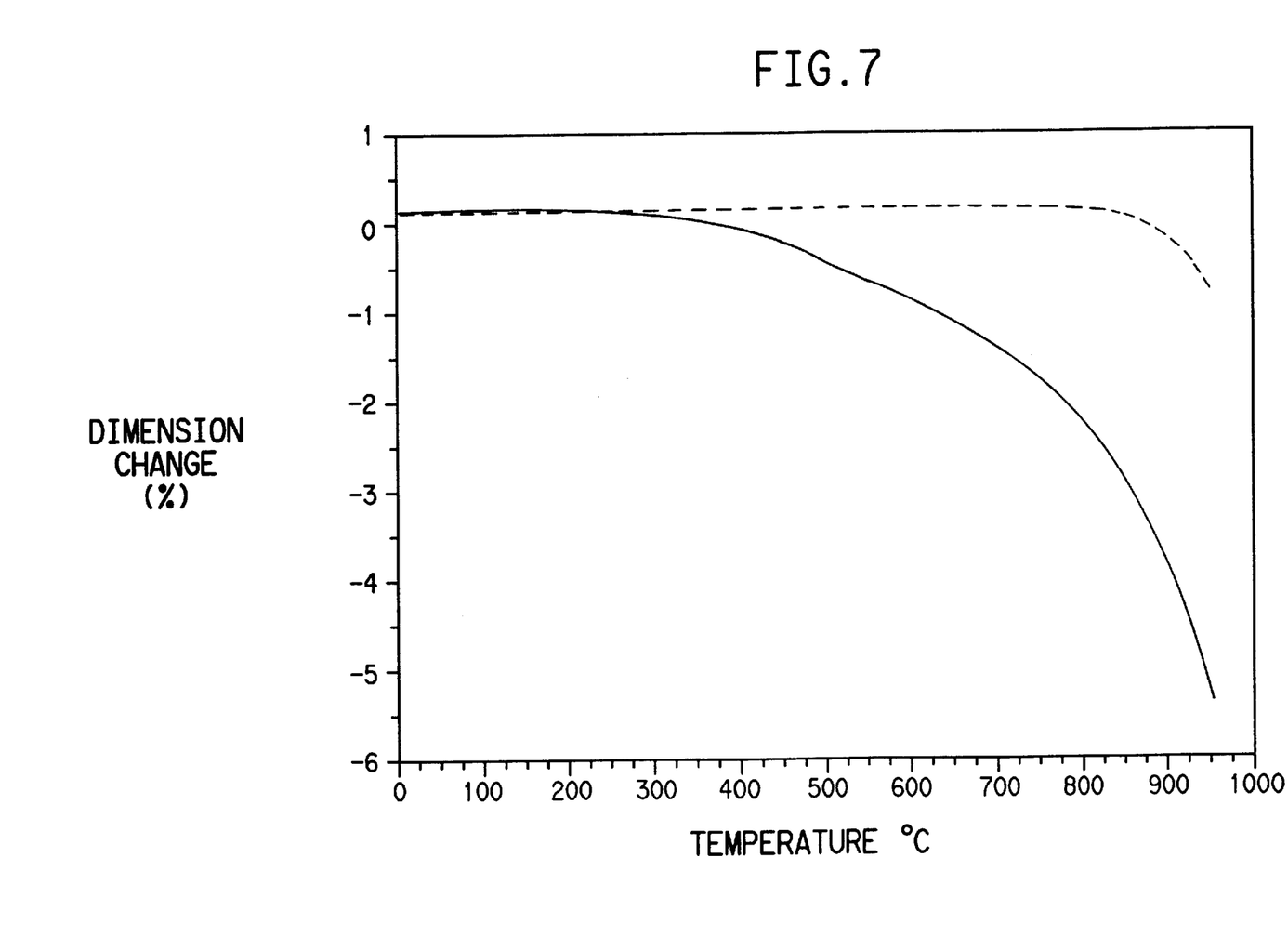

The TMA data for the pellets made from the Example 2a, b, and c powders are shown in FIGS. 5, 6 and 7, respectively. FIG. 5 shows a curve similar in character to that of the pellet made from the Minsil 40 powder given in FIG. 4. FIGS. 6 and 7 are similar in character but quite different from the trends exhibited in FIGS. 2 and 3. In these cases the pellets are observed to show approximately zero thermal expansion from 100° C. to about 300° C. After 300° C. both pellets exhibit a negative thermal expansion up to 950° C., resulting in total negative thermal expansions of approximately –5 and –6%, respectively, at that temperature. Properties of the particles were measured using the procedures of Example 1 and are provided in Table 2.

TABLE 2

|  | A powder | B powder | C powder |
|---|---|---|---|
| BET surface area | 204 m²/g | 259 | 374 |
| bulk density (Hg)* | 0.06 g/cc | 0.65 | 0.37 |
| intrusion volume (Hg)* | 15.77 cc/g | 0.95 | 1.45 |
| surface area of pores between 17–3000 angstroms in diameter (N$_2$)* | 195.8 m²/g | 382 | 552 |
| pore volume of pores between 17–3000 angstroms in diameter (N$_2$)* | 0.55 cc/g | 1.12 | 0.80 |

* (Hg) and (N$_2$) represent data obtained from mercury and nitrogen porosimetry, respectively.

None of the pellets made from the powders of Example 2 exhibit an initial negative thermal expansion over the temperature range of 100° C. to 400° C., as is the case for the pellet made using the A powder fraction from Example 1.

Having described the invention, what is claimed is:

1. A process for preparing silicon dioxide comprising, in sequence:
   a. forming a mixture of silicon dioxide particles and at least one boron compound selected from the group consisting of $B_2O_3$ and boric acid;
   b. heating said mixture to a temperature above the liquidus curve of said mixture for a time sufficient to alter the density and/or morphology of said individual silicon dioxide particles without totally melting the silicon dioxide particles;
   c. cooling the mixture to ambient conditions; and
   d. recovering silicon dioxide particles, wherein the recovered silicon dioxide particles have an altered density and/or morphology as compared to the silicon particles of step a.

2. The process of claim 1 wherein the mixture of step a contains water and the process further includes the step of removing water from said mixture prior to heating of step b.

3. The process of claim 1 wherein the mixture heated in step b consists essentially of 20 to 80% $B_2O_3$ and 80 to 20% silicon dioxide particles, by weight.

4. The process of claim 3 wherein the silicon dioxide particles contained in said mixture of step a are crystalline.

5. The process of claim 3 wherein the silicon dioxide particles contained in said mixture of step a are amorphous.

6. The process of claim 1 or 3 wherein the mixture is maintained at the temperature of step b for 1 to 20 hours.

7. The process of claim 1, wherein, in step c, the mixture sequentially is:
   (i) cooled to a temperature above the melting temperature of $B_2O_3$ but below the liquidus curve temperature for that mixture;
   (ii) at least a portion of the molten $B_2O_3$ is removed from the $SiO_2$ particles while maintaining the temperature of (I); and
   (iii) $SiO_2$ particles and any remaining $B_2O_3$ are cooled to ambient temperature.

8. The process of claim 7 wherein molten $B_2O_3$ is removed in step (ii) by filtration.

9. The process of claim 7 wherein at least a portion of residual $B_2O_3$ contained in or on the recovered $SiO_2$ particles is removed by washing said particles with water.

* * * * *